US005540629A

United States Patent [19]

Gotman

[11] Patent Number: 5,540,629

[45] Date of Patent: Jul. 30, 1996

[54] MECHANISM FOR CONTERACTING REACTION TORQUE IN A POWERED, REVERSIBLE, HAND-HELD ROTARY DRIVER

[75] Inventor: Alexander S. Gotman, Santa Monica, Calif.

[73] Assignee: Gene W. Arant, Santa Paula, Calif.; a part interest

[21] Appl. No.: 315,241

[22] Filed: Sep. 29, 1994

Related U.S. Application Data

[63] Continuation-in-part of Ser. No. 24,432, Mar. 1, 1993, Pat. No. 5,354,246, which is a continuation of Ser. No. 653,682, Feb. 11, 1991, Pat. No. 5,238,461.

[51] Int. Cl.[6] ............ F16H 48/06; B25B 17/00

[52] U.S. Cl. ............ 475/248; 81/57.14; 81/57.31; 475/332

[58] Field of Search ............ 81/57.11, 57.14, 81/57.31; 173/216; 475/223, 224, 225, 248, 332; 74/665 F, 665 G, 665 GA

[56] References Cited

U.S. PATENT DOCUMENTS

| | | | |
|---|---|---|---|
| 2,460,428 | 2/1949 | O'Leary | 475/332 X |
| 3,203,275 | 8/1965 | Hoover | 475/332 X |
| 4,462,282 | 7/1984 | Biek | 81/57.11 |
| 5,161,437 | 11/1992 | Yasutomi et al. | 81/57.14 |
| 5,238,461 | 8/1993 | Gotman | 475/248 |
| 5,354,246 | 10/1994 | Gotman | 475/248 |

FOREIGN PATENT DOCUMENTS

| | | | |
|---|---|---|---|
| 2335031 | 1/1974 | Germany | 173/216 |
| 2230218 | 10/1990 | United Kingdom | 81/57.14 |

*Primary Examiner*—Khoi Q. Ta
*Attorney, Agent, or Firm*—Gene W. Arant

[57] ABSTRACT

A reversible hand operated rotary power tool contains an internal mechanism for reducing the reaction torque that would otherwise be exhibited directly upon the housing, and hence imposed upon the hand of the operator. The mechanism is bidirectional, and reduces reaction torque to the same extent whether the tool is being operated in a forward direction or in a reverse direction. The mechanism includes a planetary differential mechanism having an input driven from a powered rotor, one separate output that is drivingly coupled to an output shaft, and another separate output that is drivingly coupled to an offset shaft that is laterally offset from the axis of the powered rotor. A lever system is employed to inhibit rotation of the offset shaft in either direction relative to the housing and thereby reduce reaction torque exhibited on the housing.

27 Claims, 4 Drawing Sheets

MECHANISM FOR CONTERACTING REACTION TORQUE IN A POWERED, REVERSIBLE, HAND-HELD ROTARY DRIVER

This application is a continuation-in-part of my application Ser. No. 08/024,432 filed Mar. 01, 1993 now U.S. Pat. No. 5,354,246, which was a continuation of my application Ser. No. 07/653,682 filed Feb. 11, 1991, now U.S. Pat. No. 5,238,461.

BACKGROUND OF THE INVENTION

My issued patent and my prior copending application disclose a powered hand-held rotary driver having an internal mechanism for minimizing the externally manifested reaction torque that will be imposed upon the hand of the operator. The tool includes a housing, a rotor supported for rotation relative to the housing, and a planetary differential mechanism having a sun gear, planetary gears, and a ring gear. The sun gear is coaxial with the rotor. The tool is characterized by the fact that the ring gear, rather than being fixed to the housing, is supported for rotation relative to the housing.

An output gear is coaxial with the sun gear and is rotatably driven by the cage of the planetary gears. A shaft is supported from the housing on an axis that is laterally offset from the axis of the rotor. The ring gear drivingly engages the laterally offset shaft, and a rotation inhibitor is attached to the offset shaft. The rotation inhibitor in my prior patent was operable for only one particular direction of rotation.

The embodiment shown in my issued patent and copending application also included concentric output shafts for use with a particular type of fastener.

There is also a need, however, to reduce the reaction torque in reversible hand-held rotary tools having only a single output. Some examples of that type of tool include powered nut drivers for attaching wheels to automobiles, and other purposes; powered screw drivers; and the like.

SUMMARY OF THE INVENTION

According to the present invention a reversible hand-held rotary tool includes a single output gear that is coaxial with both the rotor and the sun gear. A rotation inhibitor associated with the offset shaft has its rotating movement restrained in either direction of rotation, so that the rotating movement of the laterally offset shaft is also restrained.

A preferred feature of the invention is a lever system included in conjunction with the rotation inhibiting means, which multiplies the reduction of reaction torque on the housing.

According to the present invention, when rotary power is applied between the housing and the rotor, an operator holding the housing experiences only a fraction of the reaction torque that would otherwise be encountered.

Thus the object of the present invention is to provide a reversible rotary driver having a single output shaft, with an internal mechanism that greatly reduces the reaction torque imposed upon the hand of the operator.

DRAWING SUMMARY

DESCRIPTION OF FIG. 1

Figure 1:
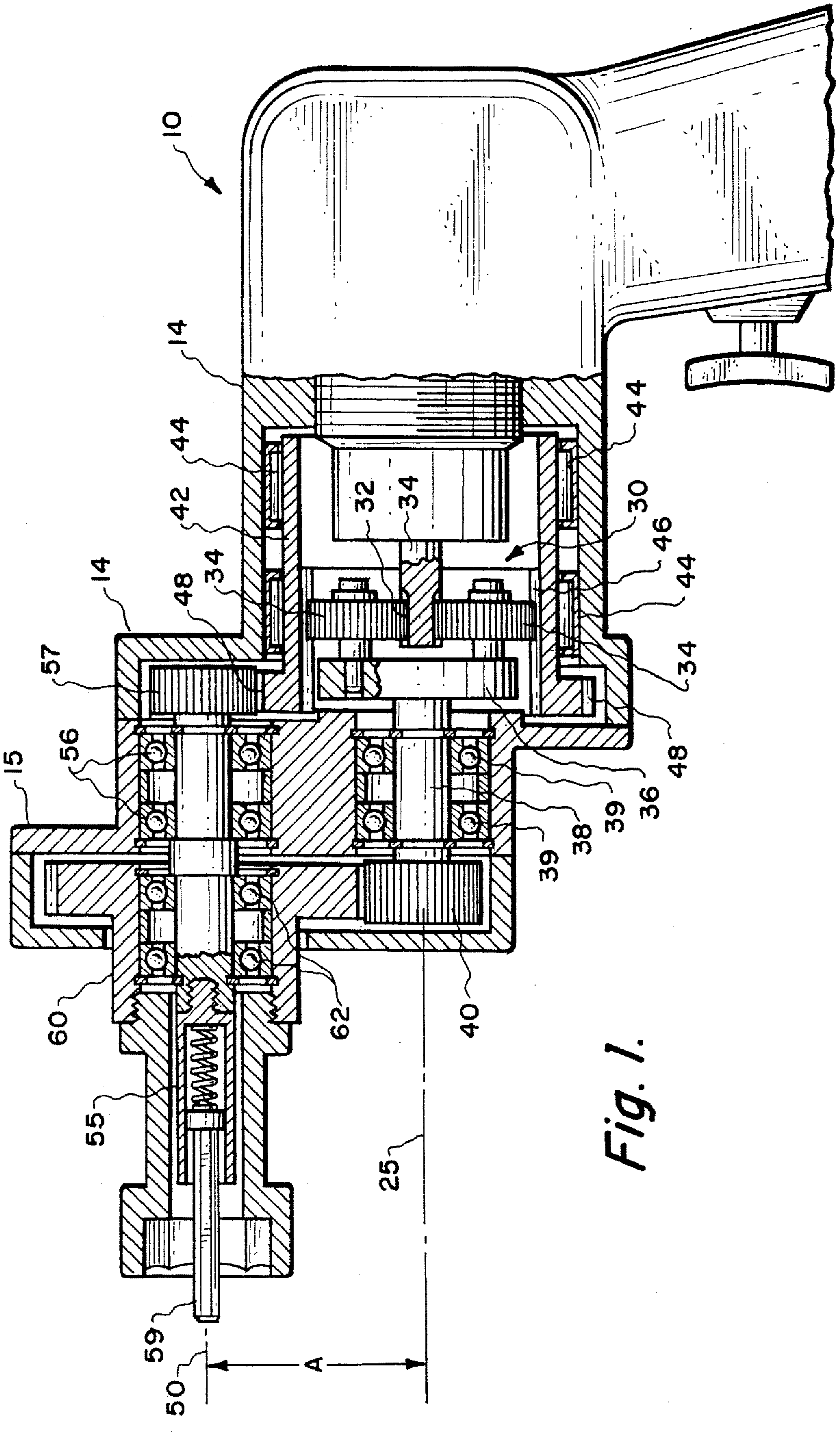
FIG. 1 is a side elevation view of a hand tool in accordance with my issued patent, shown partly in cross-section to expose the internal parts in some detail.

The hand operated rotary power tool of FIG. 1 is shown and described in detail in my issued U.S. Pat. No. 5,238,461 as FIG. 2 thereof. It includes a housing 10; an input shaft 24 rotatable on a defined axis 25 with respect to the housing and driven from a powered rotor; and a differential gear mechanism 30 including a sun gear 32 attached to the forward end of power input shaft 24 in a fixed and non-rotatable relationship, a ring gear 42 rotatably supported inside the housing, and a set of planetary gears 34 coacting with both the sun gear 32 and ring gear 42 and which rotate about the sun gear 32 on respective shafts of a cage 36. From the output of the cage 36 an extension shaft 38 on its forward end carries an output gear 40, coaxial with both the input shaft 24 and the sun gear 32 and drivingly coupled to the planetary gears 34 so as to be rotatably driven thereby.

A shaft 55 is rotatably supported from the housing on an axis 50 that is laterally offset from the axis 25 of the power input shaft 24. The ring gear 42 has inner teeth 46 which are engaged by the planetary gears 34, and a forward extension bearing outer teeth 48 that are drivingly coupled to laterally offset shaft 55 via a spur gear 57.

The main portion of ring gear 42 is rotatably supported within the housing by means of bearings 44. Extension shaft 38 is supported from the housing by bearings 39. Central output shaft 55 driven by spur gear 57 is supported in housing wall 15 by bearings 56. A circumferential output shaft 60 surrounds central output shaft 55 and is supported from central output shaft 55 by bearings 62. Thus, both of the output shafts 55 and 60 are rotatably supported from a forward extension portion 14, 15 of housing 10 by means of the bearings 62, 56, and are coaxial with the laterally displaced axis 50 of shaft 55.

A mechanism for counteracting reaction torque that would otherwise be exhibited on the housing is provided by the bearings 56, which include means for inhibiting rotation of the laterally offset shaft 55 relative to the housing in the direction that the circumferential output shaft 60 rotates relative to the housing. The bearings 56 instead of being just ball bearings are also selected to incorporate an overrunning or one-way clutch such that spur gear 57, central output shaft 55, and allen wrench 59 born by output shaft 55 may rotate in the counterclockwise direction, but not in the clockwise direction.

In operation, when rotation of output shaft 55 in the clockwise direction is being inhibited by the one-way clutch, the result is that all active and reaction torques are applied against each other internally, within the tool, and thus, being in complete balance, produce no reaction torque externally. Thus, no reaction torque is experienced by the operator.

DETAILED DESCRIPTION OF THE INVENTION (FIGS. 2–5)

Figure 2:
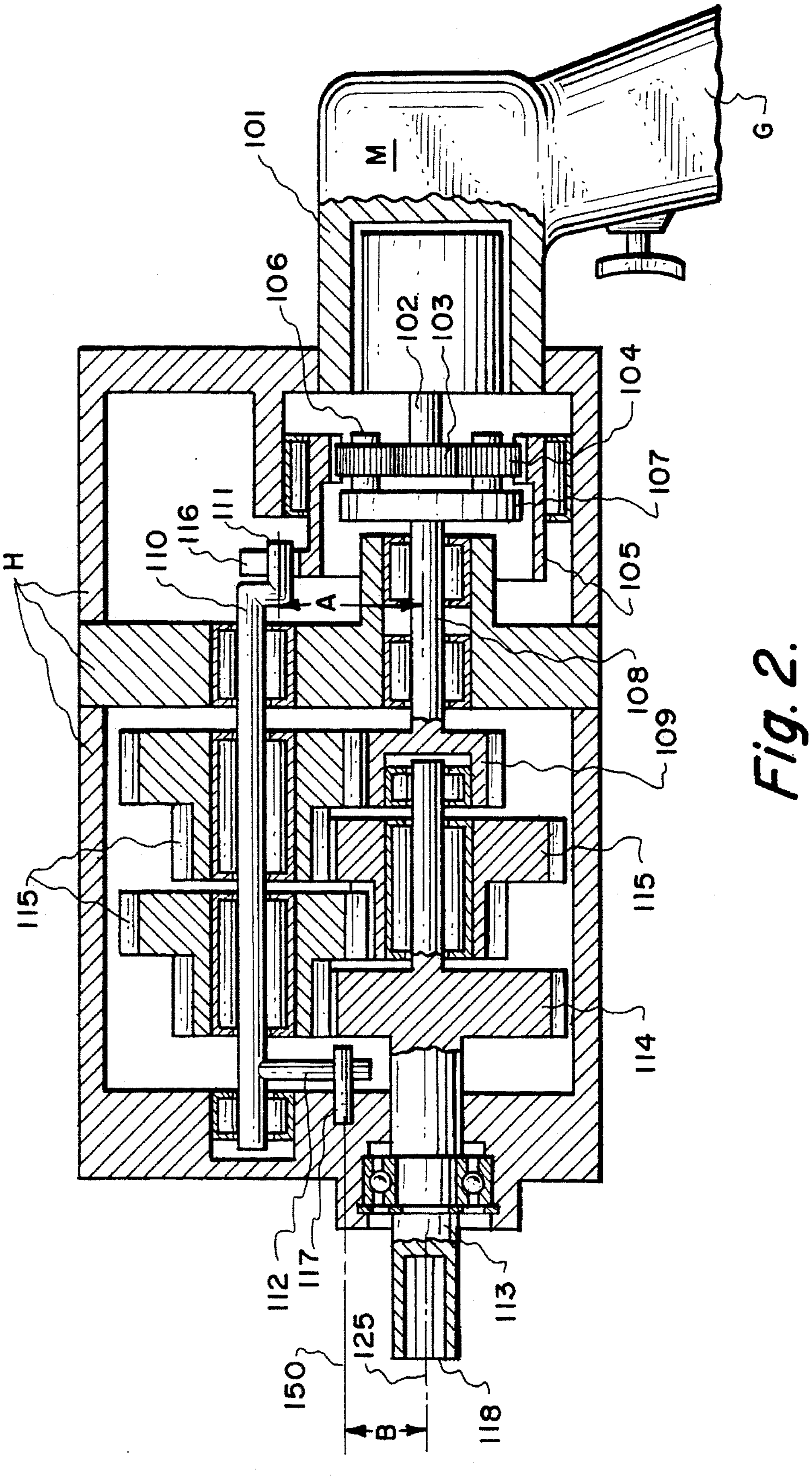
FIG. 2 is a side elevation view of a new and improved hand tool in accordance with the present invention, shown partly in cross-section to expose the internal parts in some detail.

According to the present invention a reversible powered hand-held rotary tool is adapted for minimizing an externally manifested reaction torque upon the hand of an operator. FIG. 2 is a side elevation view of a new and improved hand tool in accordance with the present invention, shown partly in cross-section to expose the internal parts in some detail.

Referring now particularly to FIG. 2, a housing H is provided with a handgrip G, and a motor M consisting of a stator 101 and a rotor 102 is rigidly secured in the housing H. The rotor 102 carries at its front end a sun gear 103. A set of planetary or satellite gears 104 is geared to both the sun gear 103 and an internally toothed ring gear 105. The planetary gears or pinions 104 are rotatably supported by a set of shafts 106, which are attached to a cage 107. The internally toothed ring gear 105 is rotatably supported by the housing H. Thus, the sun gear 103, the set of planetary gears 104, the cage 107, the set of shafts 106, and the internally tooth ring gear 105 together constitute a differential mechanism having two degrees of freedom.

The cage 107 is affixed to a central output shaft 108 which is rotatably supported within the housing H. An output gear 109 is affixed to the central output shaft 108. The useful output of this hand tool is to be derived from the output gear 109.

An offset shaft 110 is rotatably supported by the housing H, on a laterally offset axis 150. The offset shaft 110 has an input end with a crank 111 attached thereto, near the ring gear 105. The ring gear 105 is rotatably supported from the housing and has at least a pair of output teeth drivingly coupled to the handle of crank 111. A lever arm 112 has an inner end fixedly attached to offset shaft 110, and an outer or remote end extending from the offset shaft perpendicularly towards the axis of rotor 102 and of output shaft 113. The crank 111, the offset shaft 110, and the arm 112 together form a lever system, in which offset shaft 110 serves as the fulcrum.

The crank 111 is geared to external teeth of a forward extension 116 of the ring gear 105, while arm 112 is geared to an inhibiting means 117 secured to housing H. It is important to note that the length of the arm 112 is at least double, and preferably about four times or more, the distance by which crank 111 is offset from shaft 110. Thus, force applied to the crank 111 has a mechanical disadvantage in driving the remote or output end of the lever arm 112.

Figure 3:
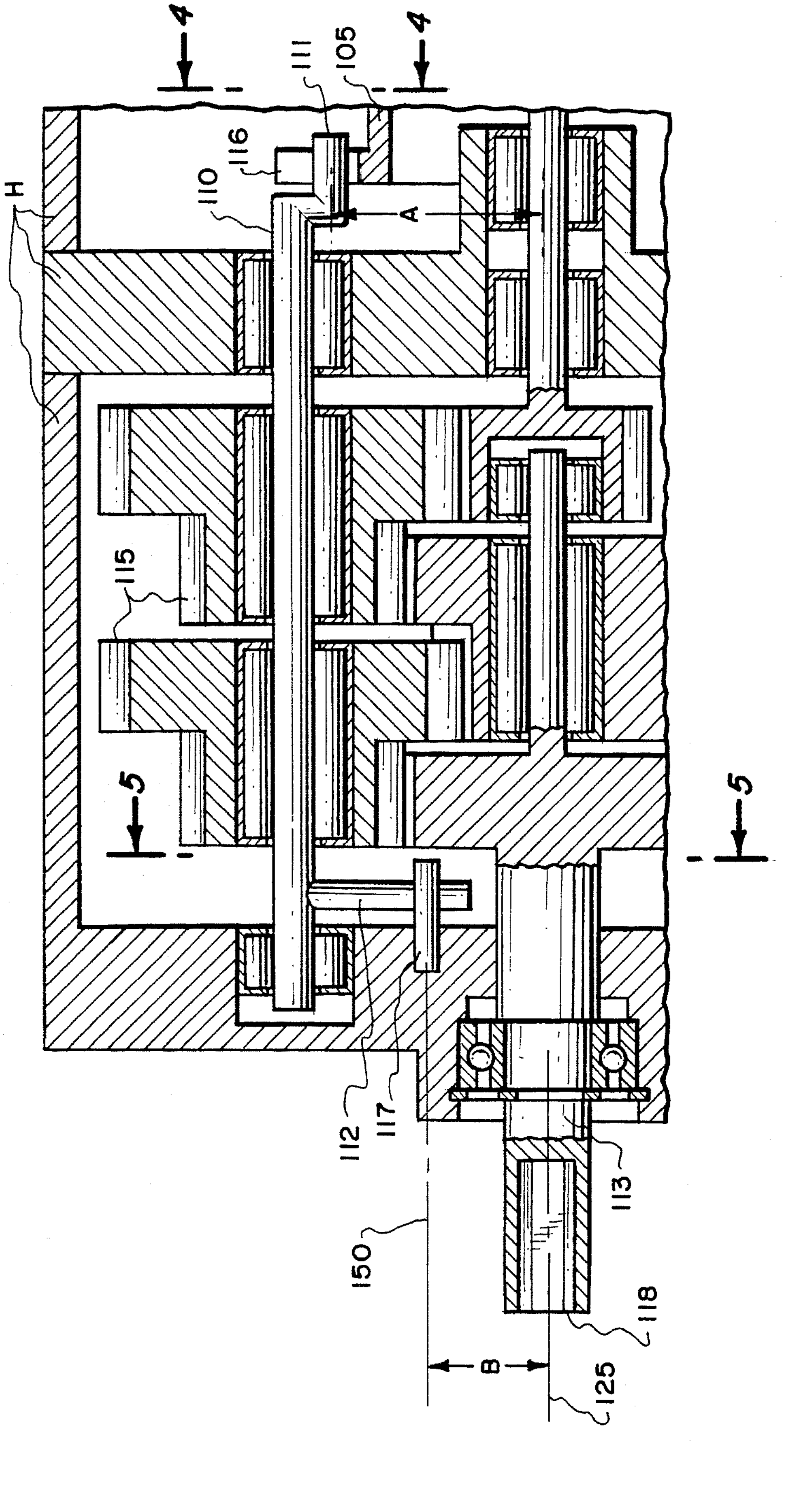
FIG. 3 is an enlarged fragmentary cross-section of the hand tool of FIG. 2.
Figure 5:
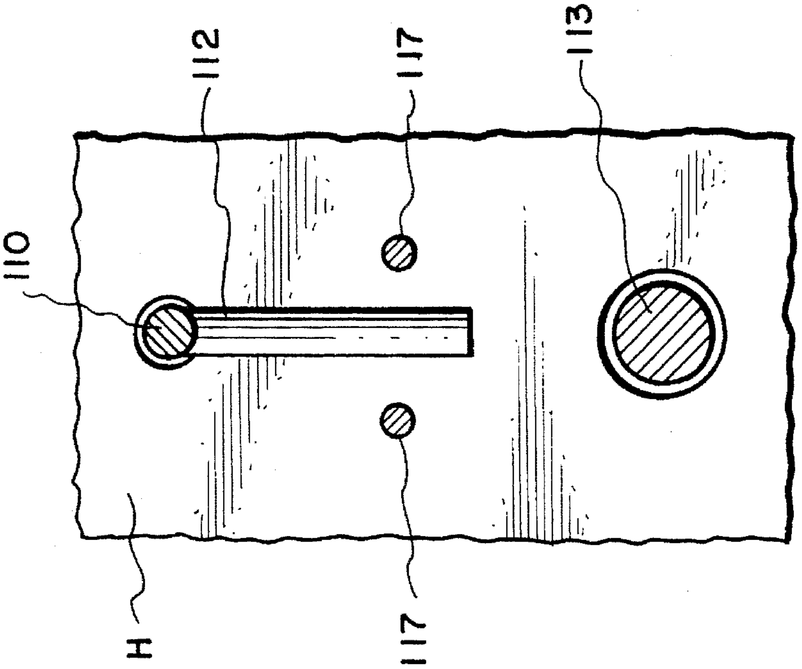
FIG. 5 is an enlarged fragmentary view taken on the line 5—5 of FIG. 3, and shown partly in schematic form.
Figure 4:
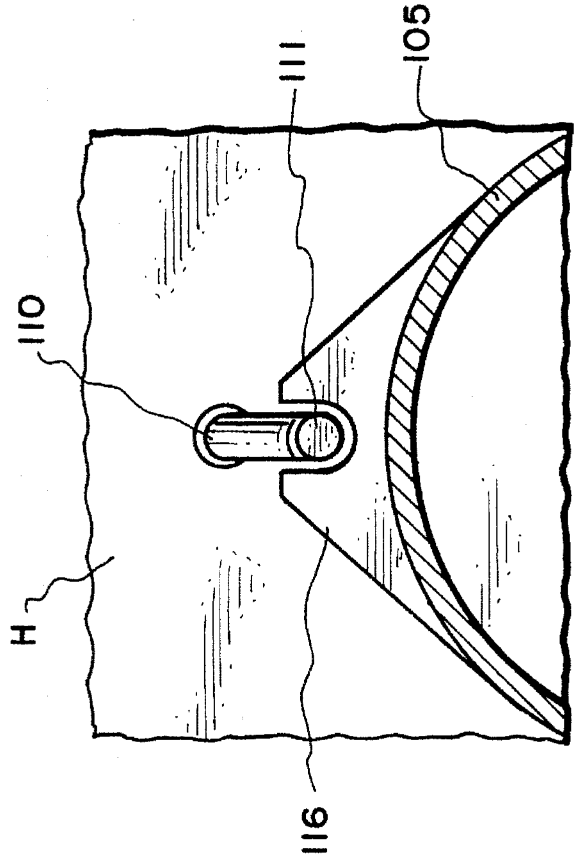
FIG. 4 is an end elevation view taken along the line 4—4 of FIG. 3.

FIG. 3 is an enlarged view and FIGS. 4 and 5 are cross-section views. Ring gear extension 116, best shown in FIG. 4, has a pair of teeth between which the handle of crank 111 is received. The inhibiting or restraining means 117 includes a pair of stops, secured to a wall of housing H, which allow rotational movement of the lever arm 112 by no more than about 90 degrees, and preferably only about 30 degrees.

An output shaft 113, aligned with the axis 125 of rotor 102, is rotatably supported by the housing H and driven from the output gear 109. It carries a final output means gear 114 affixed to it. Output gear 109 is geared to a set of combined gears 115, which is also geared to the final output means gear 114. The set of combined gears 115 is rotatably supported in part on the output shaft 113 and in part on the offset shaft 110, both of which serve as axles for the set of combined gears. The purpose of the set of speed reduction gears 115 is to provide on the output shaft 113 a rate of rotation that is greatly reduced relative to the rate of rotation of rotor 102, while at the same time producing an output torque applied to a work piece that is far greater than the torque developed by the motor M. The output shaft 113 is provided with a receptacle 118 to receive a drill bit, a screwdriver bit, or other appropriate tooling.

THEORY OF OPERATION

Disregarding the action of inhibiting means 117, the differential mechanism has two degrees of freedom. Specifically, a rotational input drive applied from the rotor 102 may result in rotation of the cage 107 about the sun gear 103 while ring gear 105 holds still; or may result in rotation of the pinions 104 about their respective shafts 106, thus driving the ring gear 105 in rotation while the cage 107 remains still. But without a specific means to decide between these two possible outputs there will, in general, be some portion of each output generated concurrently. Hence it is properly said that the differential mechanism has two degrees of freedom or two outputs.

In accordance with the Newton's Third Law of Motion, the algebraic sum of active and reaction torques within a differential mechanism having two degrees of freedom such as described above, may be expressed by an equation as follows:

$$T1+T2+T3=0,$$

where T1 is an active input torque produced by the rotor 102, while T2 and T3 are reaction torques, equal and opposite to the output torques produced by the central output shaft 108 and the internally toothed gear 105, respectively.

The above equation indicates that torques T1, T2, and T3, interacting within the differential mechanism, are always in mutual balance. It therefore also means that the differential mechanism, as a unit, always remains in the state of static equilibrium. That means further, that any or both of the output torques T2 and T3 may be transmitted from the differential mechanism and transformed into larger or smaller output torques, still maintaining the static equilibrium of the differential mechanism. It means further that the entire mechanism and, hence, the driver as a whole are always in the state of static equilibrium, though producing different output torques both in magnitude and in sense of rotation.

For the amount of power that is required, a high speed, low torque motor M is selected. The central output shaft torque T2, already enhanced from the rotor 102 low torque T1 through the differential mechanism, is further increased through the set of combined speed reduction gears 115 geared to the output gear 109 and the final output means gear 114 to a required large output means torque TL, with a proportionally reduced output means rotational velocity.

The output torque T3 of the internal tooth gear 105 is reduced by the product of two lever ratios. The first ratio is the ratio of the length of crank 111 arm to the length of arm A of the outward extension 116. This value may be 1:13. The second ratio is the ratio of the length of inhibiting means arm B to the length of arm 112. Arm B is the distance by which inhibiting means 117 is offset from axis 125 of output shaft 113. This value may be 1:5. Thus the output torque T3 of the internal tooth gear 105 is reduced to a small torque TS that is actually applied to the housing H, and which may be only $\frac{1}{65}$ of T3.

The housing H also experiences another small torque, namely, the reaction torque TR of the stator 101, which is equal and opposite to the rotor 102 torque T1. Thus the total torque TT, that an operator will have to counteract, is given by $$TT=TS+TR,$$

which is significantly smaller than the torque TL produced by the output shaft 113.

In conventional usage of a differential mechanism in a power tool the ring gear is fixed to the housing of the tool. There is then only one degree of freedom of the differential mechanism, and the reaction torque applied to the housing is the full value of T3. According to the present invention the differential mechanism has two degrees of freedom, but the system as a whole operates as having only a single degree of freedom, by virtue of the restraining means as shown and described. The difference lies in the fact that the ring gear torque is reduced by the lever mechanism, and although the reaction torque of the ring gear is still evident to the operator, its effective value has been greatly reduced. Thus, the lever mechanism effectively employs a small torque TS for controlling a large torque T3.

REVERSING THE OPERATION

According to the invention the rotation of offset shaft 110 is inhibited equally in either direction. Thus, whether the machine is used in a forward drive mode or a reverse drive mode, the reduction in reaction torque experienced by the operator is the same. When the direction of operation is reversed, the ring gear 105 will rotate slightly so that the force it applies to crank 111 arm will come now from the opposite tooth of the teeth of ring gear extension 116. The offset shaft or torsion rod 110 then rotates through only a small portion of a revolution, in essentially a rocking movement.

ALTERNATE FORMS

Although in the presently preferred embodiment the ring gear extension 116 has only two teeth and a single crank 111 is attached to the offset shaft, it will be understood that gear extension 116 may in fact have several teeth and the crank may be replaced by a one-quarter or one-half of a full gear. Such mechanism still provides the advantage of not requiring an enlargement of the housing to accommodate a full gear on the offset shaft.

The present embodiment of the invention shown in FIGS. 2 through 5 assumes that a driving motor is actually mounted within the housing H. In many applications, however, it is preferred to utilize a flexible drive shaft that brings power from another location. The tool may simply be encased in a cylindrical, or preferably elliptical, housing, with the flexible drive shaft entering the input end of the tool. In this situation the torque TR, that is, the reaction torque of the motor stator, is no longer applied to the tool itself, but instead to any distant structure to which the motor is secured. Then the torque experienced by the operator becomes

TT=TS, thus reducing the reaction torque that the operator experiences to an extremely small fraction of the torque applied to the work, such as less than one on-thousandth, or 0.1 percent.

While the presently preferred embodiment of the invention has been disclosed in considerable detail in order to comply with the patent laws, it will nevertheless be understood by those persons skilled in the art that many variations are possible, and that the scope of the invention is to be limited only in accordance with the appended claims.

What I claimed is:

1. A hand operated, reversible, rotary power tool having a housing, a powered rotor rotatable on a defined axis with respect to said housing, and an output shaft coaxial with said rotor, and being adapted to reduce the reaction torque that would otherwise be exhibited directly upon the housing, comprising:

an offset shaft rotatably supported from said housing on an axis laterally offset from the axis of said rotor;

means for inhibiting rotation of said offset shaft in either direction relative to said housing after a predetermined angle of rotation; and a planetary differential mechanism having an input driven from said powered rotor, and two separate outputs, one of said separate outputs being coupled to said output shaft and the other of said separate outputs being a ring gear coupled to said laterally offset shaft.

2. The apparatus of claim 1 wherein said planetary differential mechanism includes a sun gear rotatably supported from said housing coaxial with and driven by said rotor, a set of planetary gears coacting with said sun gear, and a ring gear rotatably supported from the housing and coacting with said planetary gears;

means drivingly coupling said set of planetary gears to said output shaft; and said ring gear being drivingly coupled to said laterally offset shaft.

3. The apparatus of claim 2 wherein said means drivingly coupling said set of planetary gears to said output shaft is a set of combined speed reduction gears.

4. The apparatus of claim 2 wherein said laterally offset shaft has an input end with a crank arm attached thereto, said ring gear has at least two external gear teeth drivingly coupled to said crank arm, and wherein said inhibiting means further includes a lever arm having an inner end fixedly attached to said offset shaft, and said lever arm extending perpendicularly from said offset shaft for restricting rotation of said offset shaft.

5. The apparatus of claim 4 wherein said lever arm also has an outer end extending toward said output shaft, and wherein said inhibiting means further includes a pair of stops attached to a wall of said housing for restricting the rotating movement of said outer end of said lever arm.

6. The apparatus of claim 5 wherein said stops are sufficiently close together to allow said offset shaft to rotate by no more than about ninety degrees.

7. The apparatus of claim 1 wherein said laterally offset shaft has an input end with a crank arm attached thereto, and wherein said inhibiting means further includes a lever arm having an inner end fixedly attached to said offset shaft and an outer end extending perpendicularly therefrom for restricting rotation of said offset shaft.

8. The apparatus of claim 7 wherein said outer end of said lever arm extends toward said output shaft, and wherein said inhibiting means further includes a pair of stops attached to a wall of said housing for restricting the rotating movement of said outer end of said lever arm.

9. A reversible, single-output hand operated rotary power tool having a housing, and a powered rotor rotatable on a defined axis with respect to said housing, said reversible power tool being characterized by a mechanism for reducing reaction torque that would otherwise be exhibited directly on the housing, and comprising:

an output shaft;

a planetary differential mechanism including a sun gear rotatably supported from the housing coaxial with and driven by said rotor, a set of planetary gears coacting with said sun gear, and a ring gear rotatably supported from the housing and coacting with said planetary gears;

gear means drivingly coupling said set of planetary gears to said output shaft;

an offset shaft rotatably supported from the housing on an axis that is laterally offset from both the axis of said rotor and the axis of said output shaft, said ring gear being drivingly coupled to said laterally offset shaft; and means for inhibiting rotation of said laterally offset shaft in either direction relative to the housing after a predetermined angle of rotation.

10. The apparatus of claim 9 wherein said gear means is a set of combined speed reduction gears.

11. The apparatus of claim 9 wherein said laterally offset shaft has an input end with a crank arm attached thereto, said ring gear has at least two external gear teeth drivingly coupled to said crank arm, and wherein said inhibiting means further includes a lever arm having an inner end fixedly attached to said offset shaft and which extends perpendicularly therefrom for restricting rotation of said offset shaft.

12. The apparatus of claim 11 wherein said lever arm also has an outer end extending toward said output shaft, and wherein said inhibiting means further includes a pair of stops attached to a wall of said housing for restricting the rotating movement of said remote end of said lever arm.

13. The apparatus of claim 12 wherein said stops are sufficiently close together to allow said offset shaft to rotate by no more than about ninety degrees.

14. A reversible, hand operated rotary power tool comprising a housing, a powered rotor rotatable on a defined axis with respect to said housing, and an output shaft, said reversible rotary power tool being characterized by a mechanism for reducing the reaction torque that would otherwise be exhibited upon said housing, and comprising:

an offset shaft rotatably supported from said housing on an axis that is laterally offset from the axis of the rotor;

means for inhibiting rotation of said laterally offset shaft in either direction relative to said housing after a predetermined angle of rotation, including a lever arm having an inner end fixedly attached to said offset shaft and an outer end extending toward the axis of said rotor, and means for restricting the movement of said outer end of said lever arm relative to said housing; and a planetary differential mechanism having an input driven from said powered rotor, and two separate outputs, one of said separate outputs being drivingly coupled to said output shaft and the other of said separate outputs being drivingly coupled to said laterally offset shaft.

15. The apparatus of claim 14 wherein said planetary differential mechanism includes a sun gear rotatably supported from said housing coaxial with and driven by said rotor, a set of planetary gears coacting with said sun gear, and a ring gear rotatably supported from said housing and coacting with said planetary gears;

said ring gear being drivingly coupled to said laterally offset shaft; and which further includes means drivingly coupling said set of planetary gears to said output shaft.

16. The apparatus of claim 15 wherein said means drivingly coupling said set of planetary gears to said output shaft is a set of combined speed reduction gears.

17. The apparatus of claim 15 wherein said laterally offset shaft has an input end with a crank arm attached thereto, and said ring gear has at least two external gear teeth drivingly coupled to said crank arm; and wherein said inhibiting means further includes a lever arm fixedly attached to said offset shaft and extending perpendicularly therefrom for restricting rotation of said offset shaft.

18. The apparatus of claim 17 wherein said lever arm also has an outer end extending toward said output shaft, and wherein said inhibiting means further includes a pair of stops attached to a wall of said housing for restricting the rotating movement of said remote end of said lever arm.

19. The apparatus of claim 18 wherein said stops are sufficiently close together to allow said offset shaft to rotate by no more than about ninety degrees.

20. A hand operated rotary power tool comprising:

a housing, and a powered rotor rotatably supported on a defined axis with respect to said housing;

a planetary differential mechanism having a sun gear rotatably supported from said housing coaxial with and driven by said rotor, a set of planetary gears coacting with said sun gear, and a ring gear rotatably supported from said housing and coacting with said planetary gears;

an output means rotatably supported from said housing;

means drivingly coupling said set of planetary gears to said output means;

an offset shaft rotatably supported from said housing on an axis laterally offset from the axis of said rotor;

said laterally offset shaft having an input end with a crank arm attached thereto, and said ring gear having at least a pair of output teeth drivingly coupled to said crank arm;

a lever arm having an inner end fixedly attached to said offset shaft, and having a remote end extending from said offset shaft perpendicularly towards the axis of said rotor;

stop means secured to said housing for restricting the rotating movement of said remote end of said lever arm; and the application of torque from said ring gear through said offset shaft, said lever arm, and said stop means to said housing having a mechanical disadvantage whereby the reaction torque imparted to said housing is less than if said ring gear were fixedly attached to said housing.

21. A hand operated rotary power tool as in claim 20 wherein said stop means is adapted to restrict the rotating movement of said remote end of said lever arm in either direction of rotation of said offset shaft.

22. A hand operated rotary power tool as in claim 20 wherein the application of torque from said ring gear to said housing has a mechanical disadvantage of about 65 to 1.

23. In a hand operated rotary power tool including a housing; a powered rotor rotatably supported on a defined axis with respect to said housing; a planetary differential mechanism having a sun gear rotatably supported from said housing coaxial with and driven by said rotor, a set of planetary gears coacting with said sun gear, and a ring gear coacting with said planetary gears; an output means rotatably supported from said housing; and means drivingly coupling said set of planetary gears to said output means; an improvement for reducing the reaction torque imparted through the housing to the hand of an operator, comprising:

an offset shaft rotatably supported from said housing on an axis laterally offset from the axis of said rotor, and having an input end with a crank arm attached thereto;

said ring gear being rotatably supported from said housing and having at least a pair of output teeth drivingly coupled to said crank arm;

a lever arm having an inner end fixedly attached to said offset shaft, and having a remote end extending from said offset shaft perpendicularly towards the axis of said rotor; and stop means secured to said housing for restricting the rotating movement of said remote end of said lever arm.

24. A hand operated rotary power tool as in claim 23 wherein said stop means is adapted to restrict the rotating movement of said remote end of said lever arm in either direction of rotation of said offset shaft.

25. A hand operated rotary power tool as in claim 23 wherein the application of torque from said ring gear to said housing has a mechanical disadvantage of about 65 to 1.

26. A hand operated rotary power tool as in claim 24 wherein the application of torque from said ring gear to said housing has a mechanical disadvantage of about 65 to 1.

27. A rotating drive mechanism with reduced reaction torque comprising:

a housing;

a differential mechanism having a driven sun gear rotatably supported from said housing, a ring gear, and a set of planetary gears with a cage adapted to be drivingly coupled to an output means;

means rotatably supporting said ring gear of said differential mechanism from the housing;

an offset shaft rotatably supported from said housing in laterally offset relation to the axis of the sun gear, and having a crank arm fixed to one end thereof;

said ring gear being drivingly coupled through said crank arm to said offset shaft; and means restricting rotation of said offset shaft to a portion of a revolution.

* * * * *